United States Patent [19]

Amundson et al.

[11] Patent Number: 4,680,781
[45] Date of Patent: Jul. 14, 1987

[54] DATA TELECOMMUNICATIONS SYSTEM AND METHOD WITH UNIVERSAL LINK ESTABLISHMENT

[75] Inventors: Anthony P. Amundson, Holliston; Nathan Melhorn, Framingham, both of Mass.

[73] Assignee: Microcom, Inc., Norwood, Mass.

[21] Appl. No.: 793,583

[22] Filed: Oct. 30, 1985

[51] Int. Cl.[4] .................. H04L 1/08; H04L 27/00
[52] U.S. Cl. ........................................ 375/8; 370/24; 370/31; 370/41; 371/31; 375/121; 379/93; 364/900
[58] Field of Search ............... 375/7, 8, 9, 37, 39, 375/58, 121; 364/200, 900; 370/24, 41, 43, 84, 31, 94; 178/63 R, 63 F; 455/73; 179/2 DP, 3; 371/32, 33

[56] References Cited

U.S. PATENT DOCUMENTS

| | | | |
|---|---|---|---|
| 3,644,896 | 2/1972 | Chaddha | 375/8 X |
| 3,657,700 | 4/1972 | Lutzker | 371/37 |
| 4,215,243 | 7/1980 | Maxwell | 179/2 DP |
| 4,270,205 | 5/1981 | DeShon | 371/32 |
| 4,377,862 | 3/1983 | Koford et al. | 371/32 |
| 4,425,664 | 1/1984 | Sherman et al. | 375/8 |
| 4,578,796 | 3/1986 | Charalambous et al. | 375/8 |

Primary Examiner—Benedict V. Safourek
Attorney, Agent, or Firm—Pahl, Lorusso & Loud

[57] ABSTRACT

Disclosed is a data telecommunications system and method in which at least one modem which, capable of operating at a variety of transmission speeds, selects the proper speed at which to operate. An initiating modem capable of operating at a plurality of operating speeds compares the maximum operating speed of a receiving modem, and if a match is found, operation begins at that operating speed. If no match is found, operation begins at a default transmission speed.

9 Claims, 4 Drawing Figures

DATA TELECOMMUNICATIONS SYSTEM AND METHOD WITH UNIVERSAL LINK ESTABLISHMENT

BACKGROUND OF THE INVENTION

This invention relates generally to a data telecommunications system, and more particularly to a system including modems that can establish a link with a wide variety of modem types.

Whereas microcomputers were once only used as dedicated and completely isolated devices, they are now used for a wide range of applications, many of which require microcomputers to communicate with each other. Problems develop with such communication because of the existence of a wide variety of microcomputers which are incapable of directly communicating with each other. As a result, many data communication systems for microcomputers force the microcomputer to work principally as a dumb terminal for a remote mini- or mainframe computer. Therefore, to facilitate more sophisticated communication, communication protocols which enable data communications between a wide range of computers, from low end microprocessors to large mainframes, have been developed. The proliferation of protocols, however, not to mention operating systems and microprocessors, has for the most part precluded the adoption of a standard file transfer method.

A communication protocol is basically a set of rules that defines how the computers interact. For two computers to transfer a file successfully, they must observe the same protocol. Typically, a protocol specifies when to send a message, how to format the information in the message, and at the other end, how to acknowledge the receipt of the message.

Simple physical connect protocols are concerned only with hardware configurations. Establishing the basic physical connection between two computers requires that a particular series of steps be followed. The originating modem initiates its sending sequence, and the telephone number representing the receiving modem's electronic address is formatted as a series of pulses or tones sent into the telephone network. The receiving modem senses the incoming call as a relatively high voltage (sufficient to cause a phone to ring) and interprets this as a request to establish a connection. If the connection is established, an acknowledgement message sent to the transmitting modem thereby establishes the connection. Such a physical link is capable of being established because both modems use the same physical connect protocol. These basic connect protocols are fairly standard, particularly for the low speed, asynchronous modems commonly used with microcomputers, such as Bell 103 and 212A modems. However, as communications become more complex and involve dissimilar machines and file formats, the protocols must, in turn, become increasingly sophisticated.

Connecting two computers is only a small part of the communications work necessary for accurate data transfer. Telephone lines are often noisy, and errors can crop up in the transmitted data. These errors must be detected and corrected. The resources available to store incoming data must also be passed and matched so that the recipient is not flooded with data. Also, information regarding the computer file system must be swapped and file movement and manipulation must be defined. These concerns, therefore, go beyond the physical-level protocols into the realm of complex communications protocols.

One protocol which enables complex communications between microcomputers is the Microcom Networking Protocol (MNP) which has been developed by Microcom Corporation of Norwood, Massachusetts, the assignee of the present application. MNP provides a sophisticated communications system which includes provisions for both reliable terminal-type communications and reliable file transfer in a manner which can reasonably be implemented on a wide range of computers. MNP accounts not only for hardware and operating systems differences, but also provides sophisticated error checking. As a result, file exchanges are thus possible between almost any computers using an MNP based communication system.

The MNP protocol, which has been developed principally for use with microcomputers, includes three layers, and the use of only three layers enables MNP to provide the necessary services with the desired space and performance characteristics for a microcomputer environment. The three layers or modules are combined to perform a series of complex functions in a manner in which changes in one module will not affect another module, as long as the interfaces of the modules remain the same.

In MNP, each layer is relatively isolated and provides a specific service. If a change is forced in one layer (for example, if MNP is modified for use on a new computer), the change is confined to that layer while the layer's standard interface to the other layers remains unchanged. In addition to ensuring machine portability, MNP's structure allows services provided by one layer to support those in the layer above. The accumulation of services is then passed upward, from layer to layer to the applications program. MNP defines three unique protocol layers in addition to the physical connection: the link, the session, and the file protocol layers. The protocol layers are triggered sequentially from the bottom (physical) to the top (file transfer).

The link layer, with which this invention is concerned, is responsible for providing reliable, controlled data transmission over a medium that is inherently noisy and likely to cause errors. Once a physical connection is established between two machines, the link protocol acts as a negotiator causing both computers to agree on the nature of the link. For example, the link protocol establishes whether the connection will be half- or full-duplex, how many data messages can be sent before confirmation is required, the size of a single data packet, etc. After establishing values for the above requirements, the link protocol initiates data transfer, paces the flow of data and, if necessary, retransmits data messages that contain errors due to telephone line noise. The link protocol allows blocks or packets of data (as opposed to individual bytes) to be sent synchronously or asynchrously to the receiving computer. Data transfer is faster when packets are transmitted synchronously because start and stop characters are not needed, and therefore, the ratio of data to control characters regulating the transfer is higher.

The session layer negotiates with the receiving computer with respect to the pertinent system and file information including computer type, how files are formatted, the type of information transmitted (e.g. ASCII, binary) and the user's identity. This layer also provides the automatic negotiation of which level of service can be used between the two communicating devices.

The file transfer layer defines and formats the messages involved in file transfers and manipulations. There are three transfer services available: one allowing the sending of a file, the second allowing the receipt of a file, and the third allowing the appending of a file to an existing file at the other end of the communications link. The file transfer protocol also enables the manipulation of distant computer files. For example, such files can be deleted, renamed or file directories may be displayed. A typical file transfer starts when one computer sends a "file start" message to the other computer. The file start message includes the requested file's name, size and format along with any password needed for the file's return trip to the requesting computer. Both computers exchange "hellos" along with a confirmation that a file will be soon filed by one side and accepted by the other.

In order for any communications protocol to facilitate communications among a wide variety of computers, the protocol must be able to operate in a number of modes. These modes include a matched-protocol mode for use by two communicating devices supporting the same protocol. Such a matched-protocol mode may provide optimized data transmission including any of a number of known optimizing features such as detecting and correcting errors, retransmitting damaged data, adapting files for different machines, etc. A second mode which allows straight forward data transmission (without any optimizing features) between two communicating systems must also be provided. The operating mode is generally negotiated in a lower layer, and in MNP the mode is selected in the link layer.

A modem operating under the MNP protocol discussed above has four basic modes: reliable mode, normal mode, auto-reliable mode, and direct mode. The reliable mode is the basic matched-protocol mode which provides error detection and automatic retransmission of data when an error occurs in order to ensure that communications between two communicating systems are error-free. In order to utilize this reliable mode, however, both of the communicating modems must be able to support this mode. A second mode, the normal mode, allows a modem with MNP to communicate with a modem not supporting this protocol. MNP's auto-reliable mode is an extension of the reliable mode which will automatically connect two modems in a reliable mode if such a connection is possible. In other words, if both of the communicating modems can support MNP, a reliable, error-correcting connection is established. The auto-reliable mode differs from the reliable mode insofar as the modem in the auto-reliable mode initially looks for incoming MNP protocol-indicating characters from the remote modem. If, after a predetermined amount of time has expired, these MNP characters are not detected a normal link is established. If these characters are detected, a reliable link is established. A fourth mode, the direct mode, is used for special purpose formats or character sets, and the modem buffers and flow control command settings are ignored.

Before ascertaining whether a connecting modem is capable of operating under the same matched-protocol, a modem must determine the type of the modem to which it is connected. Since neither matched nor non-matched protocols are dependent on transmission speed, the types of the modems are essential in determining the speed at which the two connected modems operate.

Existing modems are capable of operating at one of several low speeds (ex. 2400 bps, 1200 bps, 600 bps and 300 bps), and other modems can operate at high speeds (ex 4800 bps, 7200 bps and 9600 bps). These modems negotiate the operating speed at the physical level, and there is no known modem capable of operating at the high speeds that can also negotiate the low speeds.

It is therefore a principal object of the present invention to provide a data telecommunications system and method in which communications may be established between a modem of the present invention and a plurality of other modem types including high speed modems.

Another object of the present invention is to provide a data telecommunications system and method including a modem possessing the ability to operate at either a high speed or a low speed.

A further object of the present invention is to provide a data telecommunications system and method which can automatically determine the maximum operating speed at which data can be transmitted between a modem of the present invention and any other modem.

Still another object of the present invention is to provide a data telecommunications system and method which can determine the maximum operating speed at which data can be transmitted for modems operating under either a matched protocol or a non-matched protocol.

SUMMARY OF THE INVENTION

According to the present invention, a universal, hand-shaking data telecommunications system and method is provided in which one modem capable of operating under both high speeds and low speeds can determine whether operation can be established at a high speed (ex. 9600 bps) or at a low speed. To do so, the system utilizes the link layer to negotiate the physical layer protocol.

The modem includes two sets of modulation circuits and two sets of demodulation circuits—one set of each for operation at high speeds and the other set of each for operation at low speeds. Establishment of a physical connection results in the establishment of operations at the low speed. The initiating modem will then determine whether the modem to which it is connected is capable of operating under the optimizing matched-protocol under which the initiating modem operates, and if both modems operate under the matched-protocol, a connection under the matched-protocol is established.

The initiating modem operating under the matched protocol informs the receiving modem that it is capable of operating at a high speed (ex. 9600 bps), and if the receiving modem also includes appropriate second sets of modulation and demodulation circuits, the link layer will establish a connection at the high speed. Operation can also be switched back to the low speed, if necessary or desired, by the link layer.

These and other features and objects of the present invention will be better understood from the following detailed description which should be read in light of the accompanying drawings in which corresponding reference numerals refer to corresponding parts throughout the several views.

DETAILED DESCRIPTION OF THE PREFERRED EMBODIMENT

Figure 1:
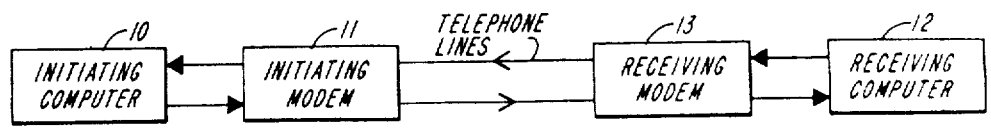
FIG. 1 is a generalized block diagram of a data telecommunications system.

A basic data telecommunications system, shown in FIG. 1 includes an initiating unit of data terminal equipment 10, such as, but not limited to, a dumb terminal or a microcomputer, and a receiving unit of data terminal equipment (DTE) 12. An initiating modulator/demodulator (modem) 11 is connected between unit 10 and communication lines (such as, but not limited to telephone lines), and a receiving modem 13 is connected between unit 12 and communication lines.

Figure 2:
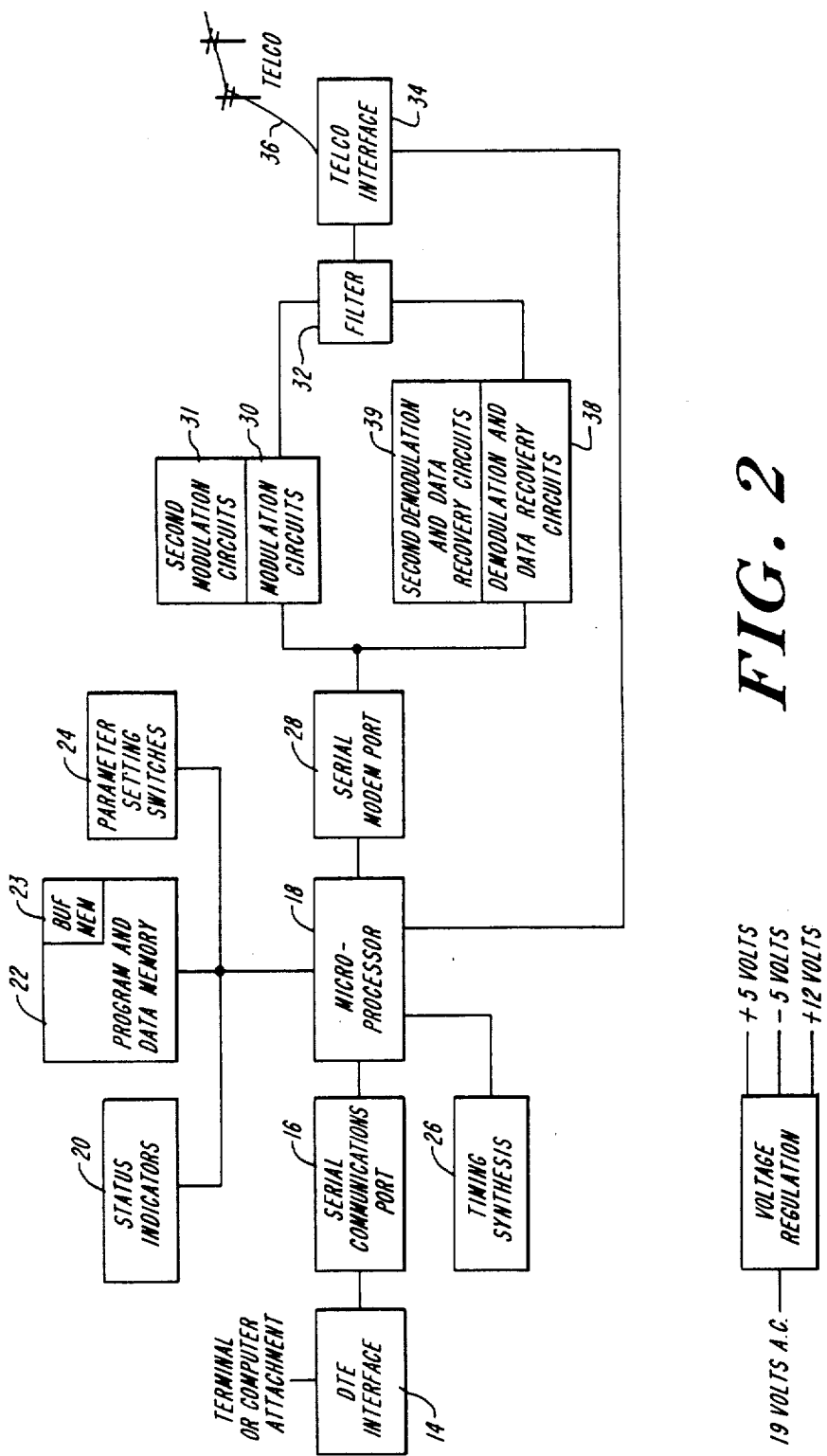
FIG. 2 is a block diagram of a modem of the present invention.

A modem of the communication system of the present invention is shown in FIG. 2. For purposes of the following discussion, the modem of the system will be described with reference to modem 13. The modem 13 includes a DTE-interface 14 which receives data coming from DTE unit 12. Data characters supplied to the DTE-interface 14 pass through a serial communications port 16 of the microprocessor 18 to which characters are fed in a serial fashion. The microprocessor 18 has connected to it status indicators 20, a program and data memory 22 and parameter setting switches 24. Timing synthesizing circuitry 26 is also connected to the microprocessor 18. Data processed by the microprocessor 18 is sent through a serial modem port 28 to modulation circuits 30 which will pass data on through a filter 32 to a telephone interface 34 and then onto telephone lines over which the data will be transmitted to another microcomputer. The modem 13 also includes demodulation and data recovery circuits 38 which are used for receiving data from another remotely situated modem, such as modem 11. When the modem 13 acts as a receiving modem, data passes through the same elements discussed above in a reverse order following the passage of data through the demodulation and data recovery circuits 38.

For purposes of enabling transmission at high speeds (such as 9600 bits per second), a second set of modulation circuits 31 are provided for transmitting data and a second set of demodulation and data recovery circuits 39 are provided for receiving data.

Figure 3:
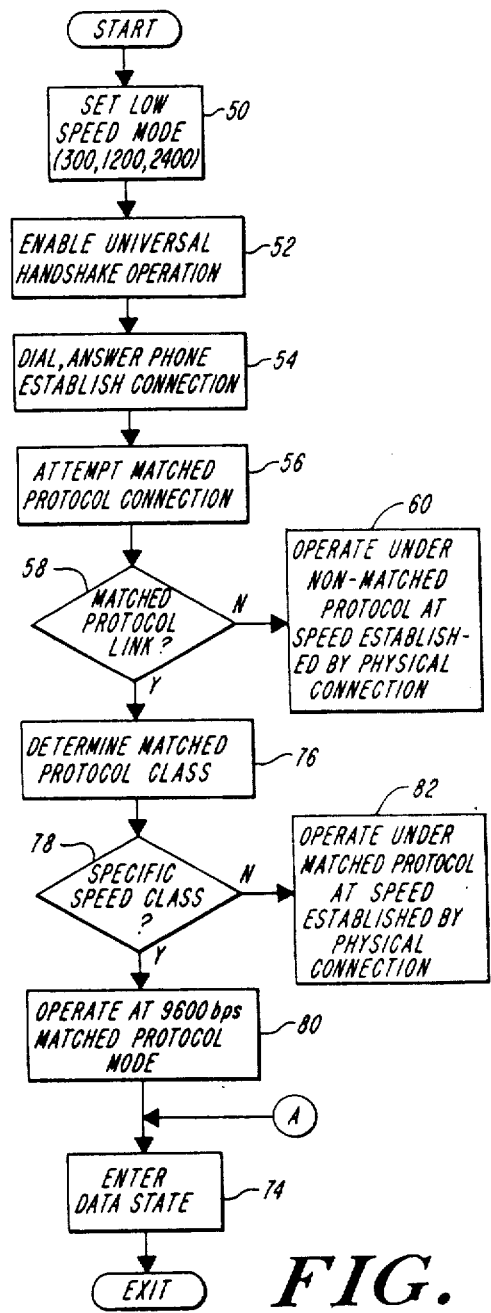
FIG. 3 is a flow diagram of the steps utilized by the modem of the present invention in choosing the optimum transmission speed at which to operate.

Referring to FIG. 3, a modem operating under a protocol, such as MNP, which offers the ability to negotiate services at the link-establishment time is set for operation at its lowest speed in step 50. The universal hand shaking operation is enabled in step 52. In the preferred embodiments, the speed setting and the enabling of the universal hand shaking operation are performed by actuating manual switches 40, 42 located on the exterior of the housing of the modem or by commands to send the modem's command port.

A modem of the present invention begins operation by establishing a physical link which is accomplished in step 54 by the answering of the phone by modem 13 and the subsequent acknowledgment to modem 11. The establishment of the physical link also involves an exchange of the type of the two modems so that a connection at the proper low speed (300-2400 bps) may be established. The connection at the low speed causes the modems to send and receive data through modulation circuits 30 and demodulation circuits 39.

Once the physical connection is established, the modem 11 will attempt to establish a matched-protocol connection in step 56. If modem 13 is not operating under a matched protocol, a non-matched-protocol link is established by step 58. The modem 11 after establishing a non-matched-protocol will then begin operation in step 60 in a non-matched-protocol at the speed established by the connection created in step 54.

If it is determined that a matched-protocol link may be established, the protocol class is then determined in step 76. If the negotiated operating class is a class that is not designed to operate at a high speed, step 78 causes the modem to begin operation in step 82 at the speed established by the physical connection in step 54. Once the operating speed and type of protocol are established, the modem 11 enters the data state in step 74 at which time data transfer begins.

If the class determined in step 78 is a class designed to operate at a high speed, the link layer of the protocol 11 will cause the modem to transmit data through modulation circuits 31 and to receive data through demodulation and data recovery circuits 39. In other words, the modem of the present invention actually includes two internal modems—one operating at high speeds through modulation and demodulation circuits 31, 39 and another operating at low speeds through circuits 30, 38. After the initial physical connection and operation under a matched-protocol are established, the initiating modem 11 of the present invention indicates to the receiving modem 13 that it is capable of operating at a high speed under the matched-protocol with a second modem. If the receiving modem 13 is also capable of operating with a similar second modem then the connection is established at the operating speed of the second modem under the matched-protocol mode. The reason a matched-protocol mode is necessary is that when data is transmitted at higher speeds, there is a much greater chance of an error occurring and as a result, the operation must be under an error correcting protocol. Following the establishment of the special class operation, the modem will enter the data state in step 74.

Figure 4:
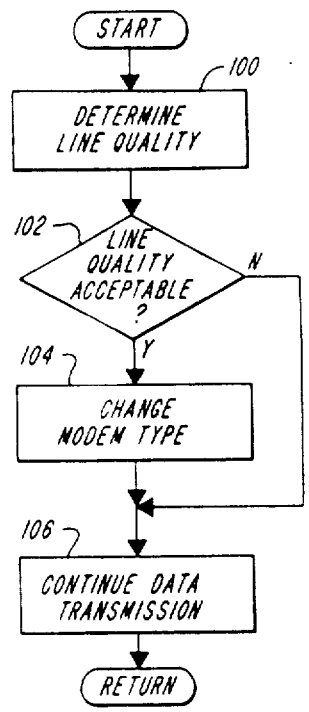
FIG. 4 is a flow diagram of steps utilized by the modem of the present invention to switch between high and low speed operation.

Referring to FIG. 4, a modem of the present invention, utilizing the second modem with the second set of modulation circuits 31 and a second set of demodulation and recovery circuits 39, can switch back and forth between operation through the first and second internal modem depending on factors such as the quality of the transmission line. In step 100 of the example of FIG. 4, this alternate embodiment will determine the line quality while the modem is in the data state, and if the line quality is acceptable, operation will continue in the data state. If, however, the line quality is unacceptable, the modem will reestablish the connection established in step 54, and the modem will begin transmitting in the speed established in step 54. Thereafter, the modem may periodically test for line quality and if found acceptable, an attempt may be made to again establish transmission at the high speed associated with the specific class of operation under the matched-protocol.

The foregoing invention provides a universal handshaking modem in which the physical layer protocol is negotiated by the link layer. The modems have the ability to differentiate between and connect a variety of modems operating at different speeds as well as operating under either a matched protocol or under a nonmatched protocol. Also, if a modem of the present invention experiences a degradation in the quality of the transmission of if a change in operating speed is required for another reason, the modem can alter the speed of transmission in order to improve the quality of transmission.

While the foregoing invention has been described with reference to its preferred embodiments, various modifications and alterations will occur to those skilled in the art. For example, any high speed modem (4800 bps or greater), in addition to a modem operating at 9600 bps, may be combined with a low speed modem to create a universal hand shaking modem. These and other such modifications and alterations are intended to fall within the scope of the appended claims.

What is claimed is:

1. A data telecommunications system for enabling data communications between an initiating unit of data terminal equipment and a receiving unit of data terminal equipment over communication lines, said system including an initiating modem connected between said initiating unit and the communication lines and a receiving modem connected between said receiving unit and the communication lines, said system comprising:

a first means for modulating data signals transmitted over said communication lines and a first means for demodulating data signals transmitted over said communication lines, both of said first means included in each of said initiating modem and said receiving modem, said first means allowing said modem to transmit data at a low speed (2400 bps or less);

a second means for modulating data signals transmitted over said communication lines and a second means for demodulating data signals transmitted over said communication lines, both of said second means being included in said initiating modem and said receiving modem and being separate from said first means, said second means allowing said modem to transmit data at a high speed (4800 bps or greater);

means for initially establishing a physical connection between said initiating modem and said receiving modem at said low speed utilizing said first modulating means and said first demodulating means in each of said modems;

means for determining whether said receiving modem is capable of operating under a special optimizing protocol;

means for establishing operation between said initiating modem and said receiving modem if said receiving modem is capable of operating under said special optimizing protocol;

means for switching said physical connection between said initiating modem and said receiving modem utilizing a link layer to a connection at said high speed under said special optimizing protocol utilizing said second modulating means and said second demodulating means in each of said modems.

2. The data telecommunicatons system of claim 1 further comprising means for switching said physical connection utilizing said link layer between said initiating modem and said receiving modem from a connection at said high speed to a connection at said low speed.

3. The data telecommunications system of claim 2 further comprising means for detecting a communications condition and means for enabling said means for switching the connection between said initiating modem and said receiving modem upon the detecting of said communications condition.

4. A modem for enabling data telecommunications between an initiating unit of data terminal equipment and a receiving unit of data terminal equipment over communication lines, said modem comprising:

a first means for modulating data signals transmitted over said communication lines and a first means for demodulating data signals transmitted over said communication lines, said first means allowing said modem to transmit data at a low speed (2400 bps or less);

a second means for modulating data signals transmitted over said communication lines and a second means for demodulating data singals transmitted over said communication lines, said second means being separate from said first means, and said second means allowing said modem to transmit data at a high speed (4800 bps or greater);

means for initially establishing a physical connection between said modem and a second modem at said low speed utilizing said first modulating means and said first demodulating means;

means for determining whether said second modem is capable of operating under a special optimizing protocol;

means for establishing operation between said modem and said second modem if said second modem is capable of operating under said special optimizing protocol;

means for switching the physical connection between said modem and said second modem utilizing a link layer to a connection at said high speed under said special optimizing protocol utilizing said second modulating means and said second demodulating means.

5. The modem of claim 4 further comprising means for switching the physical connection utilizing said link layer between said modem and said second modem from a connection at said high speed to a connection at said low speed.

6. The modem of claim 5 further comprising means for detecting a communications condition and means for enabling said means for switching the connection between said modem and said second modem upon the detecting of said communications condition.

7. A method for establishing a data telecommunications connection between an initiating unit of data terminal equipment and a receiving unit of data terminal equipment, each of the units having an associated modem connected between said unit and communication lines, each of said modems including a means to provide operation at a high speed (4800 bps or above) and a means to provide operation and at a low speed (2400 bps or below), said method comprising the steps of:

establishing a physical connection between said initiating modem and said receiving modem at the low speed;

determining whether said initiating modem and said receiving modem are capable of operating under a special, optimizing matched protocol that provides error detection in a transmitted data stream and automatic retransmission of said data stream when an error occurs;

if said initiating modem and said receiving modem are capable of operating under said matched protocol, establishing a link connection between said initiating modem and said receiving modem under said matched protocal and determining a class of operation under said matched protocol;

if said class of operation is a class providing operation at a high speed, utilizing said link connection to establish a physical connection between said initiating modem and said receiving modem at said high speed.

8. The method of claim 7 further comprising the step of reestablishing the original physical connection between said initiating modem and said receiving modem after said link connection between said initiating modem and said receiving modem is established.

9. The method of claim 8 further comprising the steps of:

detecting a communications condition;

enabling the reestablishing of the original connection between said initiating modem and said receiving modem upon the detecting of said communications condition.

* * * * *